(12) United States Patent
Gonnet

(10) Patent No.: US 9,850,929 B2
(45) Date of Patent: Dec. 26, 2017

(54) GLAZING COMPRISING A PIN, AND METHOD OF MANUFACTURING THE GLAZING

(71) Applicant: SAINT-GOBAIN GLASS FRANCE, Courbevoie (FR)

(72) Inventor: Romain Gonnet, Lacroix Saint Ouen (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/500,352

(22) PCT Filed: Jul. 27, 2015

(86) PCT No.: PCT/FR2015/052068
§ 371 (c)(1),
(2) Date: Jan. 30, 2017

(87) PCT Pub. No.: WO2016/016564
PCT Pub. Date: Feb. 4, 2016

(65) Prior Publication Data
US 2017/0218990 A1  Aug. 3, 2017

(30) Foreign Application Priority Data
Jul. 30, 2014 (FR) ..................................... 14 57379

(51) Int. Cl.
*B60J 10/08* (2006.01)
*F16B 5/06* (2006.01)
*B60J 1/00* (2006.01)

(52) U.S. Cl.
CPC ............... *F16B 5/065* (2013.01); *B60J 1/005* (2013.01); *B60J 1/006* (2013.01)

(58) Field of Classification Search
CPC .............. B32B 17/10; B32B 17/10036; B32B 17/10761; B32B 2333/00; B32B 2367/00;
(Continued)

(56) References Cited

U.S. PATENT DOCUMENTS 4,376,359 A * 3/1983 Redman ................ E06B 3/5835
52/127.1
4,581,868 A * 4/1986 McCann ................... E04B 2/92
428/34
(Continued)

FOREIGN PATENT DOCUMENTS

DE   10 2005 036 908 A1   2/2007
EP      0 242 223 A2    10/1987
FR      2 980 444 A      3/2013

OTHER PUBLICATIONS

International Preliminary Report on Patentability and the Written Opinion of the International Searching Authority as issued in International Patent Application No. PCT/FR2015/052068, dated Jan. 31, 2017.
(Continued)

*Primary Examiner* — Kiran B Patel
(74) *Attorney, Agent, or Firm* — Pillsbury Winthrop Shaw Pittman LLP

(57) ABSTRACT

A glazing includes a glazed element and at least one pin for positioning or fixing the glazing on a structural element, notably a vehicle bodywork element. The pin includes on the one hand a base which is bonded using a layer of adhesive material to a surface of the glazed element or which has an overmolded part situated in a profiled-seal portion, and an outer part situated outside of the profiled-seal portion and on the other hand a projecting element which has a guide or fixing head and a foot, the projecting element including a system for clipping it to the base with respect to a vertical central axis A.

8 Claims, 3 Drawing Sheets

Figure 1:
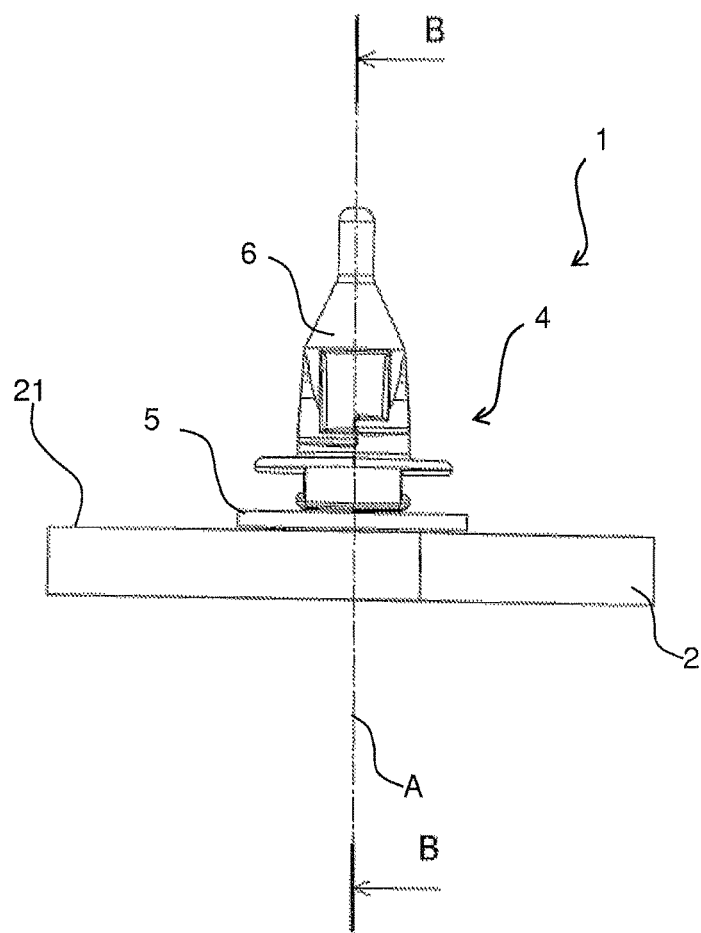

(58) Field of Classification Search
CPC ............ B32B 17/10293; E06B 3/5436; H01L 2924/00; H01L 2924/0002; B29C 47/0009
USPC ............................................ 296/146.15, 84.1
See application file for complete search history.

(56) References Cited

U.S. PATENT DOCUMENTS

| | | | | |
|---|---|---|---|---|
| 4,680,206 A * | 7/1987 | Yoxon | ...................... | E04B 2/90 156/109 |
| 5,196,153 A * | 3/1993 | Kramer | .................. | A47G 19/12 156/305 |
| 5,540,514 A * | 7/1996 | Demars | ............. | B32B 17/10036 403/122 |
| 5,567,097 A * | 10/1996 | Morin | .................. | B60S 1/0444 411/34 |
| 5,617,684 A * | 4/1997 | Sheath | ...................... | E06B 3/68 52/204.57 |
| 5,953,213 A * | 9/1999 | Napierala | ........... | H01L 23/5385 174/541 |
| 6,442,911 B2 * | 9/2002 | Elmer | .................. | E06B 3/5436 403/388 |
| 6,715,955 B2 * | 4/2004 | Ginzel | ...................... | E06B 3/02 403/384 |
| 6,941,721 B2 * | 9/2005 | Lind | ...................... | E06B 3/5436 411/107 |
| 7,155,869 B2 * | 1/2007 | Wildenhain | ...... | B32B 17/10036 403/115 |
| 7,987,643 B2 * | 8/2011 | Nugue | ...................... | E06B 3/02 52/235 |
| 8,186,901 B2 * | 5/2012 | Scheer | ................ | B66B 11/0253 403/201 |
| 8,850,760 B2 * | 10/2014 | Bodin | ............... | B29C 45/14377 52/204.53 |
| 2002/0050108 A1 * | 5/2002 | Kreyenborg | ........ | E04F 13/0855 52/306 |
| 2003/0138307 A1 * | 7/2003 | Lind | ................. | B32B 17/10293 411/34 |
| 2004/0261336 A1 * | 12/2004 | Konstantin | ............... | E04D 3/08 52/200 |
| 2006/0101737 A1 * | 5/2006 | Platz | ................. | B32B 17/10036 52/204.5 |
| 2008/0010921 A1 * | 1/2008 | Lin | ....................... | E06B 3/5436 52/235 |
| 2008/0190051 A1 * | 8/2008 | Nugue | .................. | E06B 3/5436 52/204.5 |
| 2013/0086855 A1 * | 4/2013 | Grandgirard | ..... | B29C 45/14065 52/204.591 |
| 2013/0186018 A1 * | 7/2013 | Grandgirard | ............. | B60J 1/10 52/204.72 |

OTHER PUBLICATIONS

International Search Report as Issued in International Patent Application No. PCT/FR2015/052068, dated Oct. 9, 2015.

* cited by examiner

GLAZING COMPRISING A PIN, AND METHOD OF MANUFACTURING THE GLAZING

CROSS-REFERENCE TO RELATED APPLICATIONS

This application is the U.S. National Stage of International Application Serial No. PCT/FR2015/052068, filed Jul. 27, 2015, which in turn claims priority to French Application No. 1457379, filed Jul. 30, 2014. The contents of all of these applications are incorporated herein by reference in their entirety.

The present invention relates to glazing comprising a glazed element, this glazing being intended to be positioned or fixed on a structure, notably an automobile bodywork element, by means of at least one pin. It also relates to a method for manufacturing such glazing.

Indeed it is known practice, for positioning or fixing glazing on a structure, notably automobile bodywork, to use at least one pin and preferably several pins, or insert(s), that is/are secured to the glazing beforehand by embedding it/them partially in a plastic coating, during an operation referred to as encapsulation or by bonding them in place using a layer of adhesive material.

The present invention relates specifically to glazing comprising a glazed element and at least one pin for positioning or fixing said glazing on a structural element, notably a vehicle bodywork element, said pin comprising on the one hand a base which is bonded using a layer of adhesive material to a surface of said glazed element or which has an overmolded part situated in a profiled-seal portion, and an outer part situated outside of said profiled-seal portion and on the other hand a projecting element which has a guide or fixing head and a foot, said projecting element comprising means for clipping it to said base with respect to a vertical central axis A.

Within the context of the invention it must be understood that a pin intended to allow the fixing may also, prior to fixing, be used for positioning.

In the context of the invention, it must be understood also that the overmolding may involve a prior step of bonding and that the bonding may have a prior step of overmolding.

The pins that allow the glazing to be held and referenced as it is being mounted on the bodywork may potentially make it possible to compensate for defects in the curvature of the glazed element.

It is difficult to design a correct clipping of the projecting element to the base because of the environment. It is important for the glazing to be as close as possible to the bodywork but the clipping-together of the projecting element and the base of the pin has of necessity to be achieved between the surface of the glazed element and the adjacent bodywork; the space available for clipping is therefore small and needs to be as small as possible.

This clipping-together needs to be effective and reliable.

It is an object of the present invention to overcome these disadvantages by proposing glazing with a pin in which the clipping means guide one another in order to limit the unsuitable forces which might otherwise carry the risk of causing these clipping means to break.

The present invention intends to offer a solution to the problems of the prior art.

The present invention thus consists in glazing according to claim 1. This glazing comprises a glazed element and at least one pin for positioning or fixing said glazing on a structural element, notably a vehicle bodywork element, said pin comprising on the one hand a base which is bonded using a layer of adhesive material to a surface of said glazed element or which has an overmolded part situated in a profiled-seal portion, and an outer part situated outside of said profiled-seal portion and on the other hand a projecting element which has a guide or fixing head and a foot, said projecting element comprising means for clipping it to said base with respect to a vertical central axis A.

This glazing is notable in that said base comprises a baseplate having a lower face facing toward said surface of the glazed element and an upper face situated away from said surface of the glazed element, a body oriented along said axis A from said upper surface, and a flange plate situated above said upper face so that a slot lies between said baseplate and said flange plate, in that said foot comprises at least one flange extending from said axis A and bent so that its free end is oriented toward said axis A, in that said base also has either a central recess extending downward without emerging on the lower face of said base, or a central boss extending upward, and said foot comprises, respectively, either a central boss extending downward, of cylindrical or conical shape, or a central recess extending upward, and in that said boss enters said recess and said flange enters said slot.

For the mechanical reliability of the clipping it is important that it is the base that comprises the slot and that it is the projecting element that comprises the flange (or flanges) that enters (enter) this slot.

In this way it is possible to achieve clipping of the projecting element to the base that is reliable, robust and compact.

The base and the projecting element are two distinct components of the pin.

The body of the base is preferably cylindrical. The slot is preferably situated between said baseplate and said flange plate, all around the body of the base; this slot is thus preferably annular.

For preference, the central recess is formed in the base and the boss if formed on the projecting element because that is the solution that offers the best guidance between the two components, while at the same time making it possible to achieve a clipping that is as compact as possible.

In this case, for preference, the central recess extends downward without emerging on the lower face of said base, so as to maintain the greatest possible surface area for collaboration between the lower face of said base and the adjacent surface of the glazed element.

Said foot, for preference, comprises two flanges both of which extend from the foot and are each bent so that their free ends face one another, oriented toward said axis A, said two flanges entering said slot of said base.

In this case, said two flanges extend from the foot, preferably over a radius r of 90°, so as to be as wide as possible and thus provide the most effective possible retention.

Said flange at least, or each flange, comprises, for preference, a spur or a groove and said body respectively comprises a groove or a spur: the spur, or each spur, is intended to enter the groove so as to block the position of the flange with respect to the flange plate, which means to say to block the position of the projecting element with respect to the base so as to prevent the projecting element from rotating with respect to the base about the axis A.

For preference, each flange comprises a spur or a groove and said spurs or said grooves are situated facing one another with respect to the axis A.

In an alternative form of embodiment, said flange, or each flange, extends horizontally from said axis A and is bent twice at right angles so that its free end is oriented toward said axis A.

It would be possible for said flange, or each flange, to extend at an angle that is not a right angle with respect to the axis A from said axis A.

For better retention, said flange has, for preference, a thickness substantially equal to the height of said slot.

The present invention also relates to a method of manufacturing glazing according to the invention, whereby in order to clip together said projecting element and said base, on the one hand said boss enters said recess and on the other hand said flange enters said slot by a rotation of said projecting element about the vertical central axis A.

Advantageously, by virtue of the invention, the clipping of the projecting element of the pin onto the base of the pin is reliable and robust: the risk of the most slender parts of the projecting element (the flange or flanges) breaking is limited because these parts are guided by the walls of the slot of the base.

Figure 2:
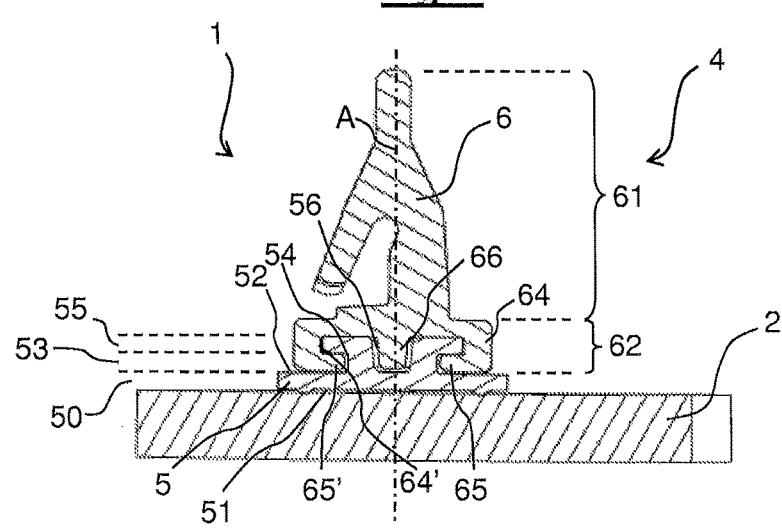
Figure 3:
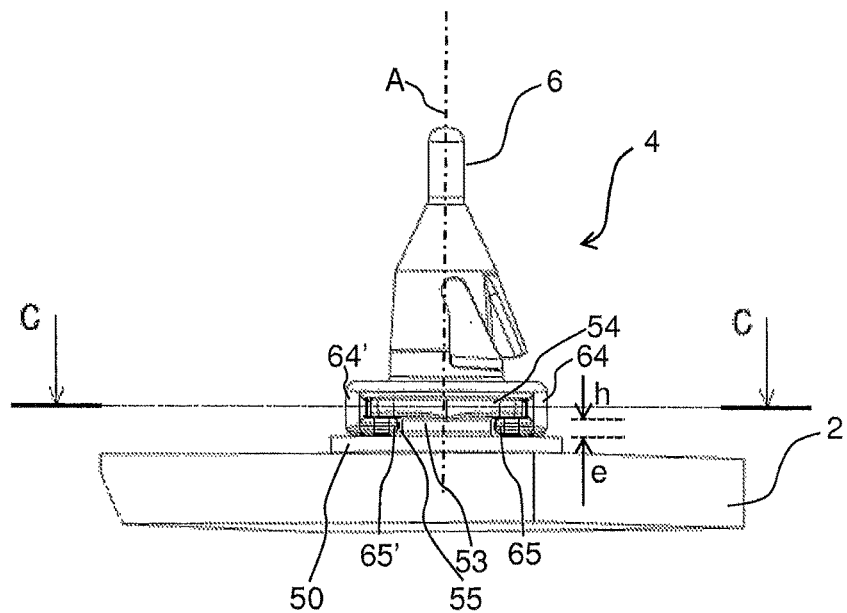
Figure 4:
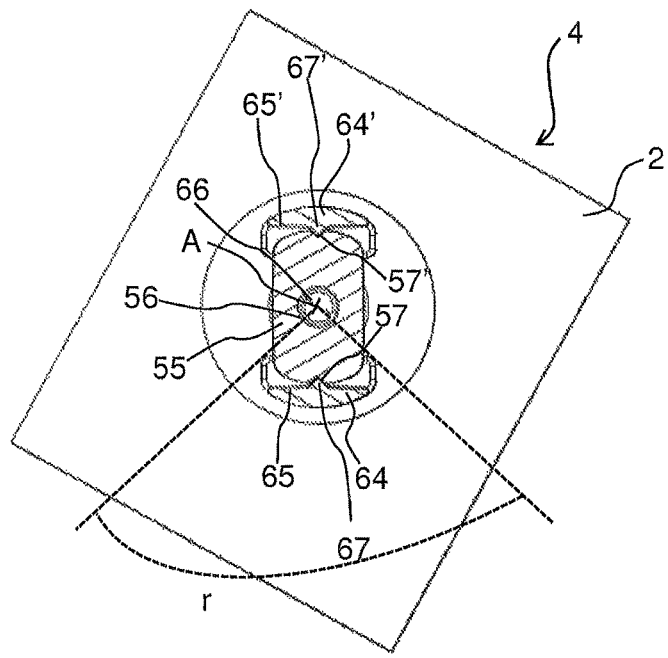
Figure 5:
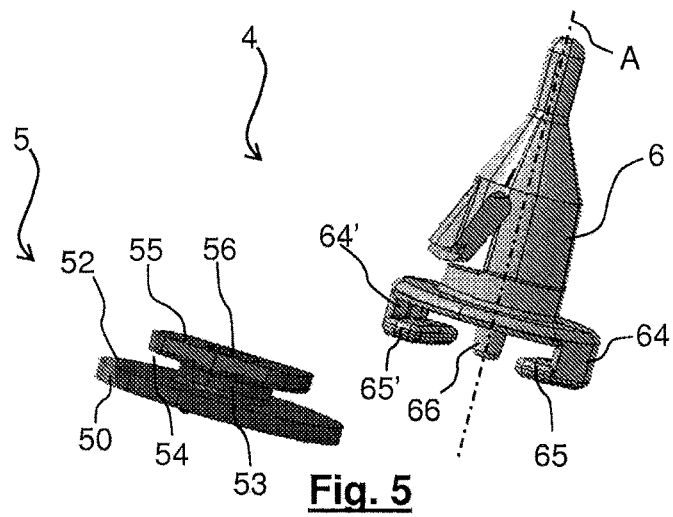
Figure 10:
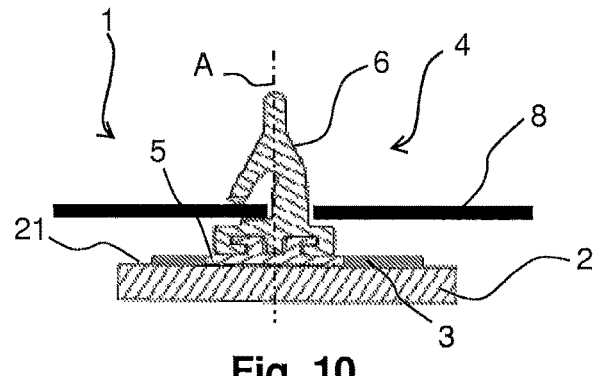

A number of embodiments of the present invention will be described hereinbelow by way of nonlimiting example with reference to the attached drawing in which:

FIG. 1 is a face-on view of a first embodiment of a pin according to the invention, FIG. 2 is a view in axial section on BB of FIG. 1, FIG. 3 is a side view of the first embodiment of FIG. 1, FIG. 4 is a view in section on CC of FIG. 3, FIG. 5 is an exploded view of the two components that make up the pin according to the first embodiment of FIG. 1, FIGS. 6 to 9 illustrate the clipping of the projecting element to the base for the first embodiment of FIG. 1, FIG. 10 is a view in axial section of a second embodiment of the pin according to the invention.

Within each figure and, in the case of FIGS. 1 to 4 on the one hand and FIGS. 6 to 9 on the other, the various elements are drawn to scale and elements in the background are generally not depicted, in order to make the figures easier to understand.

FIGS. 1 to 9 depict a pin 4 according to the invention of which part is intended to be bonded to a glazed element 2 using a layer (not illustrated) of adhesive material and another part is then clipped onto this first part. This pin 4 is thus made up of two distinct components:

on the one hand a base 5 which is bonded to a surface of said glazed element, and on the other hand, a projecting element 6.

This projecting element 6 has a guide and/or fixing head 61, intended to collaborate with the bodywork (not illustrated in FIGS. 1 to 9) and a foot 62 which comprises means for clipping it to said base 5 with respect to a vertical central axis A.

According to the invention, the base 5 comprises
 a baseplate 50 which has
  a lower face 51 oriented toward said surface of the glazed element 2, in this particular instance toward an interior face 21 of the glazed element 2, and
  an upper face 52 situated away from the surface 21 of the glazed element,
 a cylindrical body 53, which is oriented along said axis A from said upper surface 52, and
 a rectangular flange plate 55 which is situated above the upper face 52 so that a slot 54 lies between said baseplate 50 and said flange plate 55.

According to the invention, the projecting element 6 is such that the foot 62 comprises at least one flange 64, 64' which extends from said axis A and is bent so that its free end 65, 65' is oriented toward said axis A.

Furthermore, the base 5 has a central recess 56 extending downward (without opening onto the lower face 51) and said foot 62 comprises a central boss 66 extending downward, and of cylindrical or conical shape.

Thus, the central boss 66 enters said central recess 56 and said flange 64 enters said slot 54.

It is possible for it to be the foot 62 that has a central recess, which then extends upward, and for said base 5 to comprise a central boss, which then extends upward, of cylindrical or conical shape, so that likewise the central boss enters the central recess (the notions of "up/down", "upper/lower" and "vertical/horizontal" as used in this document are with reference to the vertically oriented axis A as illustrated in FIGS. 1 to 3 and 10).

The slot 54 is situated between said baseplate 50 and said flange plate 55 all around the body 53.

As visible in all the figures, the foot comprises two flanges 64, 64' both of which extend from the foot 62 and each of which is bent twice at right angles so that their free ends 65, 65' face one another, oriented toward said axis A. These two flanges 64, 64' enter said slot 54 of the base 5.

As visible in FIG. 3, the flanges 64, 64' both have a thickness e substantially equal to the height h of said slot 54, which means to say the height of the body 53.

FIG. 4 shows that the two flanges 64, 64' extend from the foot 62 over a radius r of 90° so as to obtain the greatest possible area of contact between the flanges and the slot.

This figure also shows that the flanges 64, 64' each comprise a spur 67, 67' and the body 53 respectively comprises two grooves 57, 57' which accommodate these spurs.

The spurs are situated facing one another with respect to the axis A, which means to say 180° apart. The spurs 67, 67' preferably extend over the entire thickness of the flanges 64, 64' and the grooves 57, 57' preferably extend over the entire height of said slot 54, which means to say the height of the body 53.

The flanges 64, 64' extend horizontally from the axis A and are each bent twice at right angles so that their free ends 65, 65' are oriented toward said axis A.

FIGS. 6 to 9 illustrate the clipping of the projecting element 6 of the preceding figures onto the base 5 of the preceding figures.

Figures 6, 7, 8, 9:
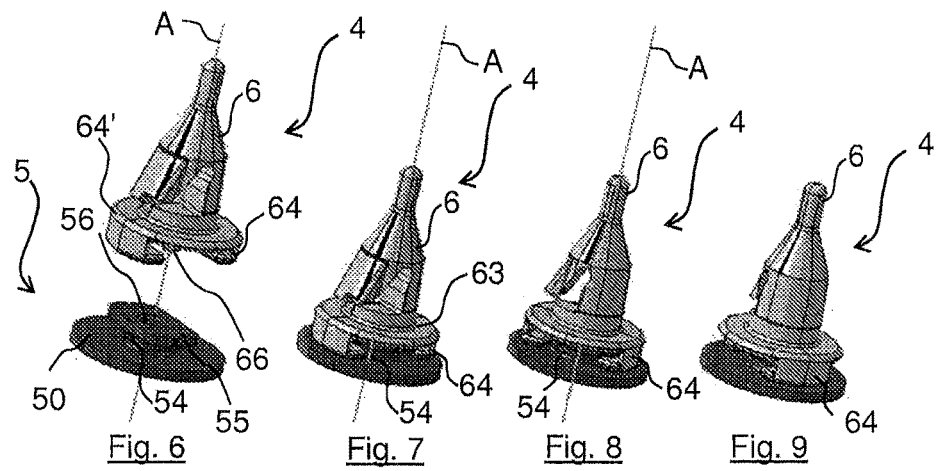

According to the invention, in order to perform this clipping, on the one hand the boss 66 needs to enter the recess 56 and on the other hand the flanges 64 need to enter the slot 54 by rotation of said projecting element 6 about the vertical central axis A; thus:

in FIG. 6, the projecting element 6 is offered up near to the base 5 and moved closer via translational movement in the direction of the axis A (illustrated as inclined in FIGS. 6 to 9 for better legibility); the two flanges 64 are offered up to face the shortest part of the slot 54 (the two parts of the slot that are of least depth);
 in FIG. 7, the two flanges 64 are introduced into the two parts of least depth of the groove 54;
 in FIG. 8, the projecting element 6 has been rotated by one-eighth of a turn with respect to the previous figure, about the axis A; the two flanges 64 are half engaged in the two parts of greatest depth of the slot 54;

in FIG. 9, the projecting element 6 has been rotated a further eighth of a turn with respect to the previous figure about the axis A and is now clipped onto the base 5: the two flanges 64 are completely housed in the two deepest parts of the slot 54; furthermore, in order to block the position of the projecting element 6 with respect to the base 5, the two spurs (not visible in this figure) have entered the corresponding two grooves.

FIG. 10 illustrates a second embodiment of the invention, in which:
- the base 5 has an overmolded part which is situated in a profiled-seal portion 3: the baseplate 50 except for the upper face 52 thereof and
- an outer part of the base 5 is situated outside said profiled-seal portion 3: the upper face 52, the body 53, the flange plate 55 and the slot 54.

FIG. 10 also illustrates an example of the collaboration between the projecting element 6 and the bodywork 8.

In order partially to encapsulate the pin 4 on the glazed element 2 as depicted in FIG. 10, the procedure described hereinbelow may be followed in succession:
- the glazed element 2 is placed in a lower part of a mold,
- the pin (or the various pins) 4 is (or are) (each) placed in a cavity provided in an upper part of the mold,
- the mold is closed; during this operation a sealing element, such as a seal for example, is pressed firmly against the upper face 52 of the baseplate 50 to ensure a good seal and prevent injection material from encroaching on this upper face,
- the plastic is injected into the molding cavity in order to form the profiled-seal portion 3.

The invention claimed is:

1. A glazing comprising a glazed element and at least one pin for positioning or fixing said glazing on a structural element, said at least one pin comprising on the one hand a base which is bonded using a layer of adhesive material to a surface of said glazed element or which has an overmolded part situated in a profiled-seal portion, and an outer part situated outside of said profiled-seal portion and on the other hand a projecting element which has a guide or fixing head and a foot, said projecting element comprising means for clipping the projecting element to said base with respect to a vertical central axis, wherein said base comprises a baseplate having a lower face facing toward said surface of the glazed element and an upper face situated away from said surface of the glazed element, a body oriented along said vertical central axis from said upper surface, and a flange plate situated above said upper face so that a slot lies between said baseplate and said flange plate, wherein said foot comprises at least one flange extending from said vertical central axis and bent so that its free end is oriented toward said vertical central axis, wherein said base also has either a central recess extending downward, or a central boss extending upward, and said foot comprises, respectively, either a central boss extending downward, of cylindrical or conical shape, or a central recess extending upward, and wherein said boss enters said recess and said flange enters said slot.

2. The glazing as claimed in claim 1, wherein said foot comprises two flanges both of which extend from the foot and are each bent so that their free ends face one another, oriented toward said vertical central axis, said two flanges entering said slot of said base.

3. The glazing as claimed in claim 2, wherein said two flanges extend from the foot over a radius r of 90°.

4. The glazing as claimed in claim 3, wherein said flange comprises a spur or a groove and wherein said body respectively comprises a groove or a spur.

5. The glazing as claimed in claim 4, wherein each flange comprises a spur or a groove and wherein said spurs or said grooves are situated facing one another with respect to the vertical central axis.

6. The glazing as claimed in claim 1, wherein said flange, or each flange, extends horizontally from said vertical central axis and is bent twice at right angles so that its free end is oriented toward said vertical central axis.

7. The glazing as claimed in claim 1, wherein said flange has a thickness substantially equal to a height of said slot.

8. A method of manufacturing glazing as claimed in claim 1, comprising in order to clip together said projecting element and said base, on the one hand causing said boss to enter said recess and on the other hand causing said flange to enter said slot by a rotation of said projecting element about the vertical central axis.

* * * * *